Nov. 18, 1924.

F. E. P. UBERROTH ET AL 1,515,913

REVOLUTION COUNTER

Filed July 28, 1921    2 Sheets-Sheet 1

Inventors
Frank E. P. Uberroth
and Werner E. Follin

By

Attorney

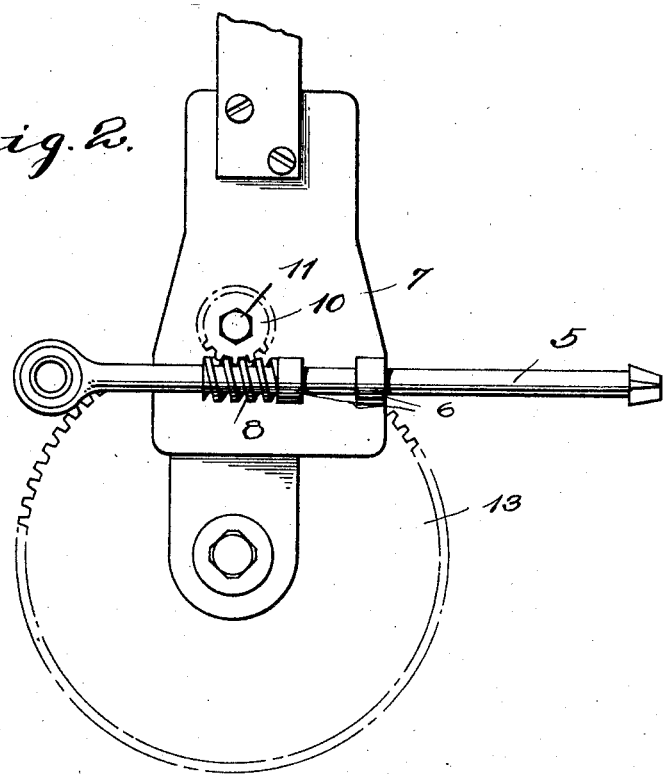
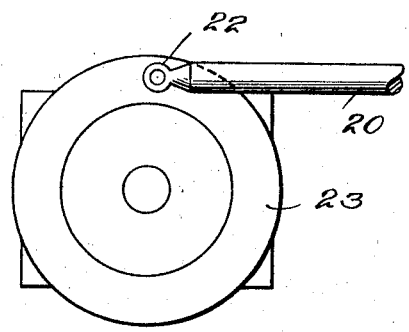

Patented Nov. 18, 1924.

1,515,913

UNITED STATES PATENT OFFICE.

FRANK E. P. UBERROTH AND WERNER E. FOLLIN, OF NEWPORT, RHODE ISLAND, ASSIGNORS TO GOVERNMENT OF THE UNITED STATES, REPRESENTED BY THE SECRETARY OF THE NAVY.

REVOLUTION COUNTER.

Application filed July 28, 1921. Serial No. 488,239.

*To all whom it may concern:*

Be it known that we, FRANK E. P. UBERROTH and WERNER E. FOLLIN, citizens of the United States, and residents of Newport, Rhode Island, have invented certain new and useful Improvements in Revolution Counters, of which the following is a specification.

This invention relates to an indicating device and recorder and more particularly to an attachment which may be applied to or installed within torpedoes for giving an accurate record of the movement of a driven member such as the speed of the torpedo measured in revolutions of the main propeller shaft, for example, during test runs.

Before torpedoes are put in service they are subjected to numerous tests in order to determine their accuracy and efficiency under actual sea-going conditions and it is desirable to ascertain wherever possible the actual performance of the engine during the run to determine its speed for any given time interval.

It is, therefore, one of the objects of the present invention to provide a simple and practical indicating and recording mechanism which may be easily and quickly applied to torpedoes in the limited space available which will give an absolute record of the speed of the engine measured in revolutions for any given time interval during the test run of the torpedo.

Other objects will be in part obvious and in part hereinafter pointed out in connection with the attached sheets of drawings forming part of this disclosure wherein Figure 1 is a general, elevational, sectional view of such parts of the mechanism as are necessary to understand the present invention.

Figure 2 is a partial plan view of the upper part of the mechanism shown in Figure 1.

Figure 3 is a detail plan view of the upper part of the mechanism shown housed in the lower part of Figure 1.

Figure 1:
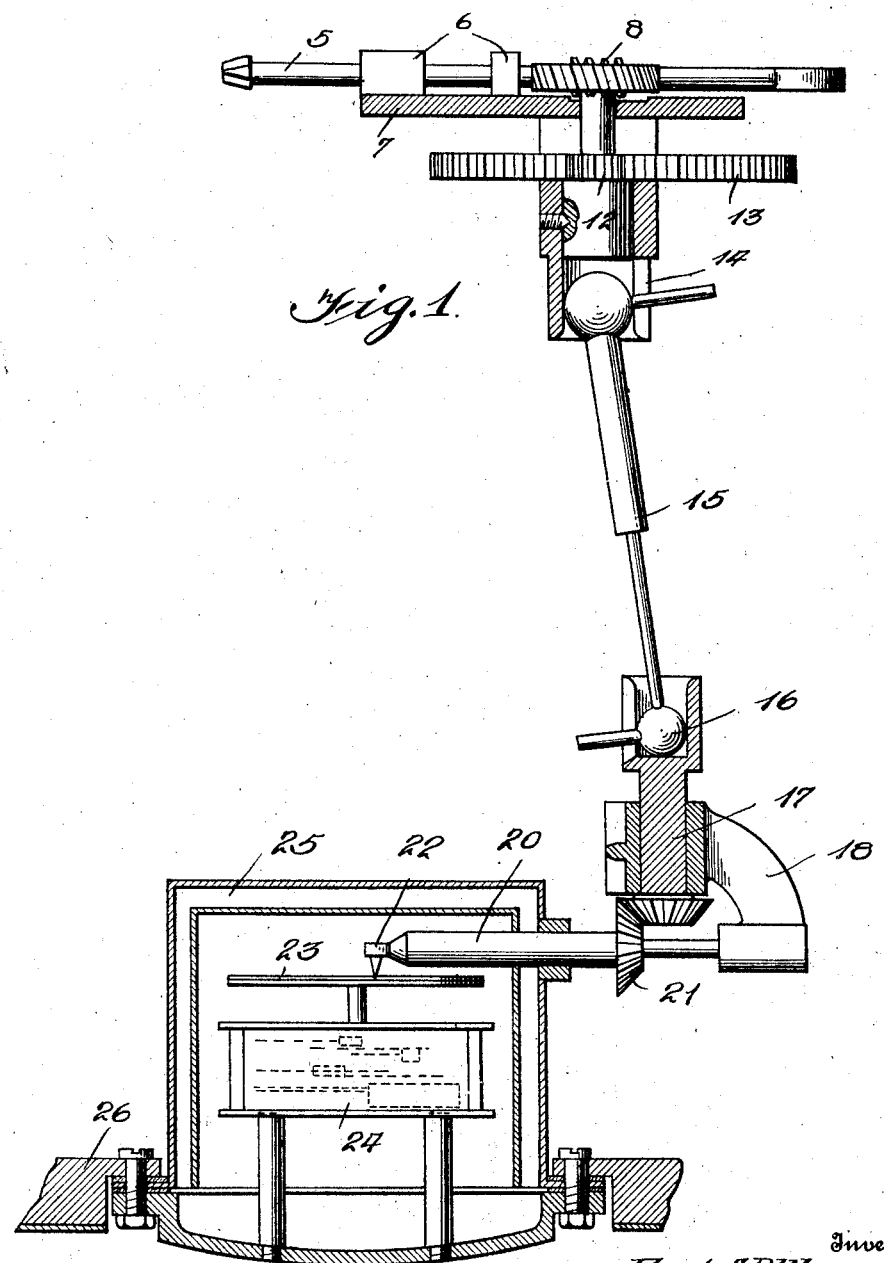

Referring now to the drawings in detail and more particularly to Figure 1, 5 denotes a shaft adapted to be connected in any desired manner with any moving part of the torpedo as, for example, the main driving shaft. This shaft 5 is mounted in brackets 6 carried upon a support 7 as shown better in Figure 2. The shaft 5 is provided with a worm 8 adapted to mesh with a small pinion 10 mounted upon a shaft 11 provided at its lower end with a second small pinion 12 meshing with a larger gear 13. This reduction gear is so proportioned that one revolution of the gear 13 is made by one hundred revolutions of the shaft 5. To the gear wheel 13 is attached a universal mechanism 14 connected by means of telescopic shaft 15 with a second universal 16 at the upper end of shaft 17 carried by bracket 18. Motion is transmitted from the shaft 17 to the shaft 20 through bevel gears 21 thereby to cause a pencil 22 to rotate once for every hundred revolutions of the shaft 5. This pencil 22 coacts with a disc 23 driven by clock-work 24. The clock-work is so timed that a complete revolution is made in eighteen minutes which is approximately the maximum length of time required for any test and the disc and pencil are so adjusted that the pencil wipes lightly over the paper once every complete revolution of the pencil. The disc 23 is preferably divided into eighteen divisions which may be used as a scale in laying off minutes when the record is completed. The clock mechanism is preferably housed within an asbestos-lined box 25 detachably mounted in an opening in the torpedo body 26.

From the above it is believed that the construction and method of operation will be clear to those skilled in the art. When the torpedo is launched movement is at once transmitted from the high speed propeller shafts to the indicator mechanism above described which causes the pencil 22 to make a fine line upon the record disc 23 at every hundred revolutions of the propeller shaft. At the end of the run when the torpedo is recovered the clock mechanism 24 is removed from its housing 25 and a complete record is found of the speed of the engine at any and all times during the run of the torpedo.

From the above it will be seen that the present invention provides a simple and practical indicator mechanism which may be easily and quickly installed in a torpedo as well as one which is reliable, efficient and durable in use and operation and while herein described as applied to the counting of revolutions of a main shaft it could very easily be attached to any other moving part for measuring the actuations of the steering mechanism for example.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What we claim is:

1. In combination with a torpedo, a recorder for torpedoes or the like having a main power shaft, means for recording the rotations of said shaft during any time interval comprising a rotating table carrying a record sheet, means for driving said table, a pencil adapted to coact with the record sheet at intervals inversely proportional to the speed of the shaft, the rotations of which are being measured, means for rotating said pencil transversely to the line of movement of the recording disc and reduction gearing interposed between said rotating pencil and the main shaft.

2. In combination with a torpedo, an asbestos lined housing, a clock work and record disc detachably mounted therein and removable from without the torpedo, a member adapted to be driven by the source of power of the torpedo, a marker adapted to coact with the disc within the housing and reducing gearing between the marker and the member driven by the source of power.

Signed at Newport, Rhode Island, this 13 day of June, 1921.

F. E. P. UBERROTH.
WERNER E. FOLLIN.